United States Patent Office

3,455,719
Patented July 15, 1969

3,455,719
METHOD OF MAKING SPONGY SUBSTANCES HYDROPHOBIC
Joseph Siebel, Bochum, and Heinrich Macura, Essen, Germany, assignors to Erz- und Kohleflotation G.m.b.H., Bochum, Bochum, Germany, a corporation of Germany
No Drawing. Filed Nov. 10, 1965, Ser. No. 507,238
Claims priority, application Germany, Dec. 22, 1964, E 28,402
Int. Cl. C04b *31/26, 31/42;* C09c *3/00*
U.S. Cl. 106—309                            2 Claims

ABSTRACT OF THE DISCLOSURE

Process for treating spongy (foamed or expanded aggregate) materials to make them hydrophobic without greatly disturbing cellular structure. Solid hydrophobic agents are surface rubbed on the spongy material under a pressure sufficiently high to cause adherence. With inorganic foams, the pressure is 300 kg./m.$^2$ (30 g./cm.$^2$) and with organic foams 200 kg./m.$^2$ (20 g./cm.$^2$).

---

Our invention relates to a method of making spongy substances hydrophobic, and more particularly to a method of applying solid hydrophobic agents to spongy substances so as to make the latter hydrophobic and therefore useful for various purposes for which the same could not otherwise be used.

It is known that natural minerals, such as perlite, mica, clay, pumice and mixtures thereof, which contain a sufficient percentage of water of hydration or of other constituents which by heating can be driven off in the form of steam or gas, can by heating up to the softening temperature be blown up into a spongy mass, such as perlite, vermiculite and bloated clay, which has a much lower specific gravity than the original material. In the case of pumice, this is to some extent effected by natural processes. These expanded spongy materials are also known as "light weight aggregate."

On the other hand, by known methods, organic sponges can be produced, for example, of urea resins, polyurethane resins, and polyester-urethane resins. All of these products, because of their structure, their great open space volume or low volumetric weight (weight per liter), exhibit heat insulation, cold insulation and sound insulation properties, and also exhibit a high degree of absorption capacity for fluids. These materials have been used for these purposes for a long time.

It is a primary object of our invention to render such spongy substances hydrophobic by means of solid hydrophobic agents.

It is per se known to make granular substances hydrophobic (water resistant) by mixing the same with liquid or solid hydrophobic agents, such as alkylpolysiloxanes, long-chain saturated or unsaturated hydrocarbons, fatty acids and/or their salts, or to add such agents thereto before or during the subdivision of the mineral substances. Long-chain saturated or unsaturated hydrocarbons, fatty acids and/or their salts may also be referred to as long-chain paraffins, paraffin-carboxylic acids, olefin-carboxylic acids, paraffin-carboxylic acid salts and olefin-carboxylic acid salts.

In the case of liquid hydrophobic agents, because of the high degre of porosity of the spongy products, several times its weight in hydrophobic agent is generally necessary if it is desired to obtain complete wetting of the surface.

The treatment of compact organic substances and minerals with solid hydrophobic agents in a mill, whereby during the milling the subdivision of the agent occurs, is known and is normally not very difficult, because in most cases it is not necessary to maintain a specific granular bond. A hydrophobic treatment of spongy or porous materials cannot, however, be solved in such simple manner.

A treatment of perlite and vermiculite with hydrophobic agents has been sought, however, such treatment based on the use of powder has resulted in insufficient water resistance than, for example, an analogously treated limestone. The difficulty of rendering spongy material hydrophobic is mainly due to the fact that the porous structure must be retained, otherwise the advantages of the use of the material in connection heat insulation or sound insulation will be lost.

It is accordingly the primary object of our invention to provide for the rendering of spongy materials hydrophobic without loss of the porous structure of the spongy material.

It is another object of our invention to provide a method of treating spongy materials with solid hydrophobic agents whereby a sufficient degree of water resistance is achieved without any loss in the porosity of the spongy material.

Other objects and advantages of our invention will be apparent by a further reading of the specification and of the appended claims.

With the above and other objects in view, the present invention mainly comprises a method of making spongy material hydrophobic by mixing of the same with solid hydrophobic agents, in which the spongy material is subjected to a surface rubbing with the hydrophobic agent in order to secure the hydrophobic agent onto the surface of the spongy material, in the case of inorganic products with a specific minimum vessel pressure of 300 kg. per m.$^2$, and with organic products of at least 200 kg. per m.$^2$ of surface, the surface rubbing being carried out for at least eight minutes.

In the case of the use of solid hydrophobic agents it has been shown that neither mixing for a long period of time, nor use of a great amount, nor a subdivision in their presence always results in a satisfactory degree of water resistance for the final products. Indeed, both in the case of mixing and in the case of the simultaneous subdivision in the presence of solid hydrophobic agents up to a very small fraction (about ¼) of the starting grain size, a limited degree of water resistance of the slightly thickened piling, for example against the penetration of a small amount of liquid in the column of a few centimeters height, is obtained. Such degree of water resistance corresponds to that of a bitumen roofing felt, however it is not sufficient for many purposes because to a great extent it is dependent on the quality of the crude product. The necessary high degree of subdivision is furthermore uneconomical because of the unavoidable increase of the loose weight and not only are the insulation properties to a great extent lost, but also costs are increased and the value of the product is lost because the spongy products are sold by volume and not by weight.

We have discovered that neither a high amount nor a high degree of mixing of the solid hydrophobic agents is decisive for this action, but rather the adhesiveness of the applied layer is decisive. By tests it has been found that the distribution of the solid hydrophobic agent on the surface results in a true water-resisting effect, but that even with a small amount of soaking in water or by a flowing pressure of several centimeters of a water column running unto the mineral surface, or partially rinsed and purified to coarser aggregates renders the same unsuitable for use in preventing the wetting of the mineral surface with water.

Furthermore, we have developed test methods to determine the adhesiveness of the distributed hydrophobic agent. This was necessary since the hitherto known tests for determining the degree of water resistance do not meet the exacting requirements which are necessary. Thus, it is known for example, in the building trade to mix lime and high grade plaster with metal soaps in order to render the same hydrophobic, as well as for example to powder fertilizers and fire extinguishing agents by mixing the same with hydrophobic substances. Indeed, in these crafts people speak of a hundred percent of water resistance, but this is not sufficiently exacting for determining the degree of water resistance which is achieved for the purposes of our invention. The demands are much less in the above mentioned cases. There it is only necessary to have a degree of water resistance to hold back a very small amount of water wetting or surface moisture. The tests for the degree of water resistance are directed thereto. The degree of water resistance for the purposes of our invention, however, considerably exceeds these requirements. The products should, for example, when used as insulating material for terminal pipes of a pressure water column of for example one meter more, stand up or at least maintain their water resisting properties upon wetting or stirring in water or in a water stream.

Hydrophobic spongy products must be tested with respect to two standpoints to determine their practical use.

Test I

They must be tested against penetration of an essentially static water column by a 20–30% thickened piling, whose grain size corresponds to the minimum of the interstices, for example, for the use as a heat damming layer for pipes which are placed in the ground.

For this purpose, the material to be tested in a 20 cm. high pile is filled in the inside of a lubricated steel pipe of 40 mm. diameter and 50 cm. height, which is placed on a solid base, and with a suitable pestle by tamping or pressing thickened to the desired degree of thickening, for example to 30%, by which the testing substance is practically made solid in the tube. A sand layer of 5 cm. is applied to the thickened testing substance and the steel tube is lengthened by the water-tight sealing of a transparent artificial plastic tube of 1–2 meter length. By observing a predetermined, carefully filled water height (for example of 1 meter) during a predetermined time (one day) there is tested whether and when water passes through the thickened pile.

Test II

A test was also carried out against a washing out of the hydrophobic material by dynamic flowing pressure of water without adhesion on a grain, for example by the use as absorption or filter material for mineral oils and the like in the presence of water.

For this purpose 400 cm. of water and 40 cm.³ of substance to be tested are introduced into a cylinder of 500 cm.³ volume having a height of about 25 cm. The cylinder is then quickly turned 20 times about 180°, so that the substance to be tested at each turning must pass through the body of water and the not wetted portion is again deposited. Depending upon the degree of adhesiveness of the hydrophobic material, either none or a specific amount of primarily fine particles go into the water phase and this can by separation and evaporation be determined.

However, it was found that this is not the case. The subdivision with the devices known in the art results in new surfaces whose degree water-resistance is subject to the same difficulties as the starting surfaces. Thus, the surface is more quickly increased than is the adhesiveness. Only in the case of extremely great degree of subdivision do both procedures take place. However, this is not desirable.

It has surprisingly been found that in order to achieve a satisfactorily high degree of adhesiveness of the hydrophobic agent onto the surface of the material, it is necessary to subject the same to a surface rubbing with at least a pressure of 300 kg. per m.² of surface with inorganic spongy substances or mineral substances, and of 200 kg. per m.² in the case of organic spongy substances during a time period which is only slightly dependent on the pressure used, and which amounts to at least 8 minutes. This surface rubbing is carried out by mixing of the material under this pressure. At the same time it is possible to subdivide the material to the desired grain size or the desired grain distance. However, in all cases it is necessary to maintain the surface rubbing under the pressure for the necessary time period.

It has further been found that if the pressure is increased greatly, which is generally the rule in technical subdividing installations, no corresponding shortening of the minimum time period occurs, so that in this case the subdivision precedes the surface rubbing. Thus, a technically properly dimensioned subdividing installation for the particular spongy product requires a subdividing time of only about ½ minute to about 3 minutes, depending upon the hardness and tackiness of the starting material, upon subdividing of an average grain size of 2 mm. to an average grain size of 0.5 mm., and this is substantially unsuitable to obtain an adhesive application of the hydrophobic agent thereto.

Since the subdividing work of the shape changing operation and the rubbing operation go together, whereby the latter is only desired in the finest milling, it is quite surprising that only in the sense of shape-changing operation with technically unsuitably dimensioned subdividing apparatuses does a satisfactory adhesion of the hydrophobic agent take place. That is, in those in which the performance and the subdividing operations are carried out through many lowering of the plate pressures between the subdividing plates, for example by numerous reductions of the milling balls or milling discs or by the use lighter balls or discs or more hollow balls or discs, which in proportion to their diameter have a lesser weight.

By proceeding in this manner it is possible to increase the adhesion of the hydrophobic agent as well as the mixing without particular subdivision during the necessary surface rubbing time as well as to obtain subdivision and adhesion of the hydrophobic agent which in the necessary time period effects the desired adhesion as well as the subdivision to the desired grain size or the desired average grain size.

The following examples are given to further illustrate the invention. The scope of the invention is not, however, to be limited to the specific details of the examples.

Example 1

In a rod mill of 1.5 m. diameter and 1.5 m. length provided with 30 iron rods of 25 kg. per m.³ is introduced spongy perlite with a loose weight of 85 kg./m.³, a grain size of 0–2 mm. with a fine grain portion below 0.2 mm. of 10%, together with 8 kg. finely granular zinc arachinate (as hydrophobic agent) and the whole is milled together for 6 minutes. The final product has a loose weight of 180 kg./m.³ and a grain portion below 0.2 mm. of 47%. The final product is according to Test 1 with a thickening of 22% subjected to a water column pressure of 1 m. After 3 hours of testing, the water passes through the material.

Example 2

In a parallel test under the same conditions of weight and the number of mill rods reduced to 18 rods of 25 kg., and the milling with the hydrophobic agent carried out for 15 minutes to a final product having a loose weight of 180 kg./m.³ and a grain portion under 0.2 mm. of 45%, the same hydrophobic agent is milled with the same spongy material. The final product is subjected to Test 1 at a thickening of 22% in a water column pressure of 1 mm. The test is broken off after four weeks without the water passing through the thickened material.

Example 3

In the same rod mill as in Examples 1 and 2, one m.³ of perlite with the same properties as in Examples 1 and 2, using a rod filling of 20 rods of 25 kg., the milling is carried out for 5 minutes with the addition of 6 kg. of calcium behenate. The final product has a loose weight of 130 kg./m.$^3$ and a grain size below 0.2 mm. of 15%. Testing of the resulting material by Test 2 results in 5% washed off fine grain portion in the water.

Example 4

The surface rubbing in the same rod mill with the same materials as in Example 3, however, with a rod filling of 14 rods of 25 kg. and the milling being carried out for 10 minutes to the same loose weight and same fine grain portion, results in a material which when subjected to the testing of Test 2 gives no turbidity to the water nor any residue of washed-out fine grain portions.

Example 5

Previously subdivided perlite material of the same loose weight and same grain portion as in Examples 3 and 4, is mixed in a mixer for 20 minutes with 6 kg. of calcium-behenate. Despite good distribution, the subjecting of the material to Test 2 results in a residue of 10% of washed-out fine grain portion in the water.

It will be understood that the loose weight of the final product, under otherwise similar conditions, depends upon the loose weight of the raw material, the latter being between about 40 and 120 kg./m.$^3$.

Although the invention has been described with respect to the rendering of certain materials hydrophobic using certain hydrophobic agents, it is to be understood that these were for exemplatory purposes only and it is further to be understood that variations and modifications can be made without departing from the spirit and scope of the invention. Such variations and modifications are of course meant to be comprehended within the meaning and scope of equivalents of the appended claims.

We claim:

1. A method for treating a spongy material selected from the group consisting of expanded perlite, mica, clay, pumice and vermiculite with a solid hydrophobic agent so as to render the spongy material hydrophobic, which comprises subjecting said spongy material to surface rubbing, at a minimum pressure of 300 kg. per m.$^2$ surface, with a hydrophobic agent, wherein the hydrophobic agent is calcium behenate, so as to cause adherence of the hydrophobic agent to the surface of said spongy material under a pressure sufficiently high to cause adherence of said hydrophobic agent on said spongy material for a time period of at least eight minutes.

2. A method of treating a spongy material selected from the group consisting of expanded perlite, mica, clay, pumice and vermiculite with a solid hydrophobic agent so as to render the spongy material hydrophobic, which comprises subjecting said spongy material to surface rubbing, at a minimum pressure of 300 kg./ per m.$^2$ surface, with a hydrophobic agent, wherein the hydrophobic agent is zinc arachinate, so as to cause adherence of the hydrophobic agent to the surface of said spongy material under a pressure sufficiently high to cause adherence of said hydrophobic agent on said spongy material for a time period of at least eight minutes.

No references cited.

JAMES E. POER, Primary Examiner

U.S. Cl. X.R.

106—308